US007075677B1

(12) United States Patent
Silverbrook

(10) Patent No.: US 7,075,677 B1
(45) Date of Patent: Jul. 11, 2006

(54) INK JET FAULT TOLERANCE USING OVERSIZE DROPS

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 1025 days.

(21) Appl. No.: 09/608,780

(22) Filed: Jun. 30, 2000

(51) Int. Cl.
*H04N 1/40* (2006.01)

(52) U.S. Cl. ........................................ 358/1.9; 358/3.21

(58) Field of Classification Search ................. 358/1.9, 358/2.1, 3.09–3.12, 3.2–3.22; 382/237
See application file for complete search history.

(56) References Cited

U.S. PATENT DOCUMENTS 5,029,108 A * 7/1991 Lung .......................... 358/1.9
5,182,575 A * 1/1993 Kato et al. .................. 347/240
5,532,828 A * 7/1996 Mitsuse ..................... 358/3.15
5,809,216 A * 9/1998 Ng ............................ 358/1.9
6,310,698 B1 * 10/2001 Samworth .................. 358/3.12
6,450,608 B1 * 9/2002 Sarmast et al. ............... 347/19

FOREIGN PATENT DOCUMENTS

| | | |
|---|---|---|
| EP | 0710005 | 5/1996 |
| EP | 1010 531 A1 | 6/2000 |
| EP | 0983855 A2 | 8/2000 |
| JP | 2000062159 | 2/2000 |

* cited by examiner

*Primary Examiner*—Thomas D. Lee
*Assistant Examiner*—Stephen Brinich

(57) ABSTRACT

A printing method identifies where parts of an image will not be printed correctly due to partial or total device failure and if possible adjusts the size of ink dots in adjacent rows or columns so as to lessen the visual effect of failure to print at the original location.

15 Claims, 2 Drawing Sheets

INK JET FAULT TOLERANCE USING OVERSIZE DROPS

FIELD OF THE INVENTION

This invention relates to digital printing and more particularly to printing using devices which eject ink onto the printed substrate. However, the invention is not limited to ink ejection devices and is also applicable to laser, light emitting diode printers and to digital photocopiers.

BACKGROUND OF THE INVENTION

In ink ejection devices a printhead has an array of nozzles through which ink is selectively ejected onto the substrate as the substrate moves relative to the printhead. The printhead may print by scanning across the substrate to print horizontal bands or, if it is a full page width printhead, it may pass along the length of the page. A blocked nozzle will result in multiple horizontal blank lines, in the case of a scanning type printhead, or a blank vertical line in the case of a page width printhead. Such blank lines are undesirable since they detract from the printed result.

The present invention provides a method of modifying the printing of an image so as to reduce or effectively eliminate the visual effect of one or more such blocked nozzles apparent to the eye of an observer in normal use. However, the invention is applicable to other forms of printing where a device, whether passive or active, is repeatedly used to produce dots of ink or the like on a substrate. The invention has potential application to laser and LED type printers and photocopiers where a fault in the imaging drum or light source can result in repeated faults in the image produced. As used above and throughout the description and claims the term image is to be understood to have a broad meaning and includes anything printed, such as text and line drawings.

DISCLOSURE OF THE INVENTION

In one broad form the invention provides a method of modifying an image to be digitally printed by a printing device to compensate for failure to correctly print dots of ink at specific locations, the method including the steps of:

a) identifying said specific location or locations, and b) adjusting the dot size of at least one a dot at a location adjacent or near to the respective specific location from that required by the image data.

In another broad form the invention provides a printer having a row of activatable devices which, when activated, cause rows of dots to be deposited onto a substrate and means to move the substrate relative to the row of devices in a direction generally perpendicular to the row of dots, said printer including:

a) means to determine if one or more of said devices is not operating correctly; and b) control means for analysing images or image data and for identifying a specific location or locations where a dot of ink should be printed by activation of a incorrectly operating device and for adjusting the size of dot produced by one or both of the devices on either side of the failed device.

The incorrectly operating device will result in a defect line or lines in the image printed. Usually the incorrectly operating device will produce no ink or not enough ink and so a blank or faint line will be produced. To compensate adjacent ink dots will be caused to be larger than required by the raw image data. Conversely if the incorrectly operating device is producing oversized ink dots, the dot size of adjacent dots will be reduced.

Where a part of an image requires the incorrectly operating device to deposit a continuous or substantially continuous column of dots, the dots in adjacent columns are preferably all adjusted in size. If there are a small minority of locations in the column of the incorrectly operating device which do not require ink, dots in adjacent columns may or may not be adjusted in size.

Dots in more than the two adjacent columns may be adjusted in size. Dots in adjacent columns may be adjusted in size only if they are within predetermined vertical or horizontal distances or both of one or more specific location. For example only dots in the columns either side of the failed column may be adjusted in size but dots in those columns two or three rows above and/or below the respective location may be adjusted in size.

BRIEF DESCRIPTION OF THE DRAWINGS

The invention shall be better understood from the following non-limiting description of preferred embodiments and the drawings, in which.

DESCRIPTION OF PREFERRED AND OTHER EMBODIMENTS

Figure 1:
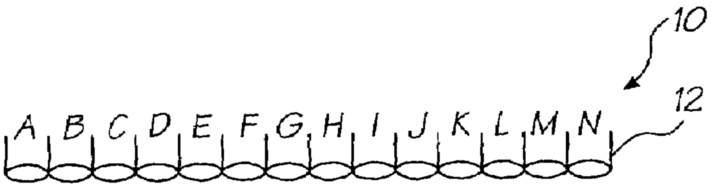
FIG. 1 shows a schematic illustration of a set of nozzles of an ink jet printing head.

Referring to FIG. 1, a printhead 10 has an array of ink jet nozzles 12 arranged in a singe line. For the purpose of explanation only 14 nozzles are shown but in practice there will be from tens to thousands of nozzles arranged in a line. Paper is passed underneath the printhead in a direction generally perpendicular to the line of ink jet nozzles, as indicated by arrow 14. The printhead may be a stationary or a movable printhead. As the paper passes under the printhead the ink jet nozzles A to N are selectively operated to cause an array of ink dots to be placed on the paper. This array is a series of columns and rows, the spacing of which is dependent on the spacing of the inkjet nozzles and the minimum paper feed step respectively. Whilst it is preferred that the horizontal and vertical spacing of the dots is the same, this is not necessarily achievable due to the different sources of the spacing. The printhead may be a page width printhead or a smaller printhead which scans across the page to lay down a series of transverse bands of printing.

For the purposes of explanation it is assumed that inkjets a-g and i-n inclusive are operating correctly but, for whatever reason, inkjet h is not operating correctly or at all. It is also assumed that the diagnostic systems of the printer, which will be well understood by those skilled in the art, have detected that nozzle h is not functioning correctly. In most cases, a malfunctioning device will be partially or totally blocked resulting in insufficient or no ink being deposited on the paper.

Figure 2:
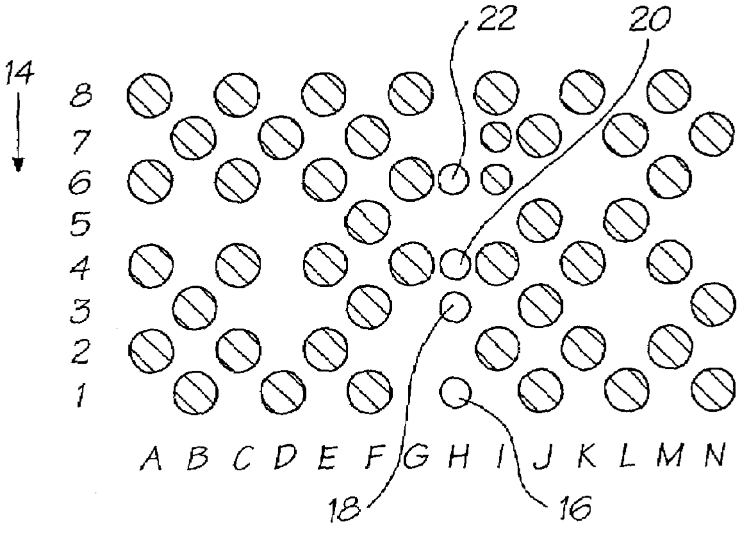
FIG. 2 shows a schematic illustration of an array of ink dots formed by the printhead of FIG. 1 without fault correction operational.
Figure 3:
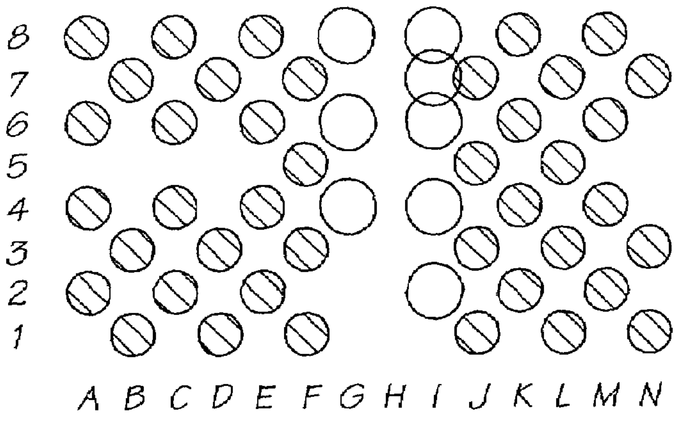
FIG. 3 shows a schematic illustration of the same array of ink dots as in FIG. 2 formed by the printhead of FIG. 1, but with fault correction operational.

Referring to FIG. 2, which schematically shows a portion of printing performed by the printhead 10 without fault correction, there is a blank column, labelled "h" corresponding to inkjet h, whilst columns a-g and i-n have been correctly selectively printed. This leads to one or more blank lines appearing in the printing depending on whether the printhead 10 is a full page width printhead or a scanning type printhead. The unshaded circles numbered 16, 18, 20 and 22 represent drops of ink which should have been printed in column h but were not. FIG. 3 shows the same image printed by the printhead 10 but with fault correction according to an embodiment of the invention operational.

Referring to FIG. 3 the ink drops in columns g and i are caused to be larger than normal, as will be explained below. This reduces the amount of white space between the dots and between the columns g and i. The effect is that the un-printed column h is not apparent to the eye of the user. When printing on A4 or letter size paper for reading at normal distances, such as at 20 to 30 cm, the effect occurs at about 1600 dpi and upwards.

In the FIG. 3 print, only dots intended to be printed anyway in columns g and i have been increased in size but it is within the scope of the invention that extra dots of ink, whether of normal size or of adjusted size, may be printed in the columns either side of the failed column in locations when the image data does not require a dot. As seen in FIG. 3 there are dots in the image at only about 50% of possible locations and so, even with oversize dots, there is still significant white space. This white space may be reduced by printing dots in vacant areas to reduce and/or break up the visual effect of the un-printed column The area of each adjusted size dot is preferably increased by about 50% but this may be more or less, as needed. The oversize dots in the two columns may just touch dots in the same column. However, the size increase may be less, such that the dots in each of the two columns of dots do not join, or may be greater, such that adjacent dots overlap.

Where ink dots are required in column h at frequent intervals oversize drops will be deposited continuously by nozzles g and i. It will be appreciated that when ink dots are deposited less frequently the drop size of ink in columns g and i will only increase adjacent or near to areas where drops should occur in column h. These moversize drops may extend into rows where no ink is intended in column h. Where ink is not intended in column h for large distances, preferably no oversize drops will be created in columns g and i.

Figure 4:
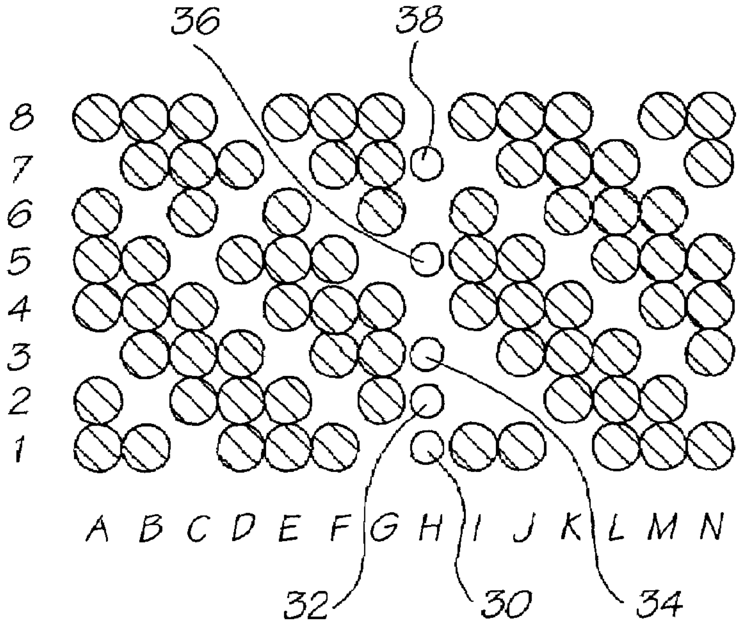
FIG. 4 shows a second schematic illustration of an array of ink dots formed by the printhead of FIG. 1 without fault correction operational.
Figure 5:
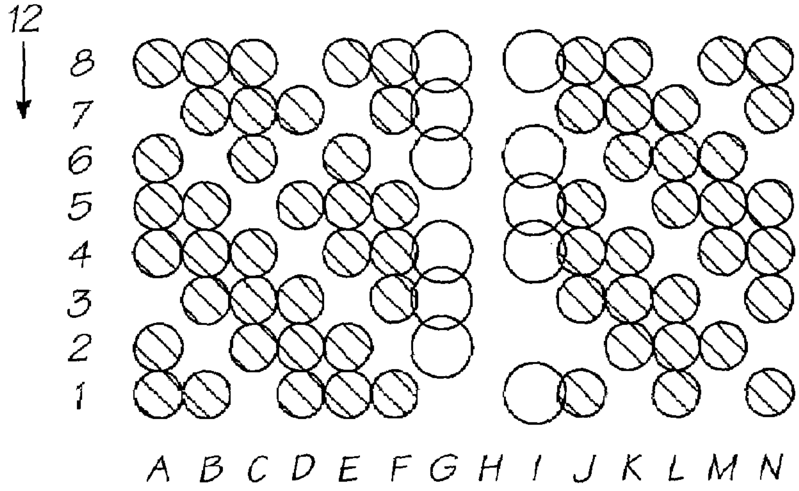
FIG. 5 shows a schematic illustration of the same array of ink dots as in FIG. 4 formed by the printhead of FIG. 1 but with fault correction operational.

Referring to FIGS. 4 and 5 there are shown a second set of schematic prints without and with fault correction respectively. As seen in FIG. 4, dots of ink are required, but not printed, in column h at rows 1, 2, 3, 5 and 7, as indicated by open circles 30, 32, 34, 36 and 38. In FIG. 5 dots in columns g and I are increased in size in rows above and below un-printed dots 30, 32, 34, 36 and 38. Because there are more dots in these columns than compared to the FIGS. 2 and 3 prints, the oversize dots overlap more and reduce the white space to a greater extent. Again, if desired, normal or oversize dots may be printed in vacant locations, such as column g, rows 1 and 5 and column I rows 2, 3 and 7.

In the case of ink ejection type printers, increased dot size is achieved by increasing the amount of ink ejected. In the case of thermal ink ejection devices this may be achieved by increasing the duration of the heating current pulse. In the case of piezo electric ink ejection devices this may be by increasing the driving voltage or current to cause greater distortion or by increasing the pulse duration. Similarly with mechanical type ink ejection devices the pulse width and/or driving voltage or current may be increased.

The invention is also applicable to situations where individual devices are producing too much ink, in which case the adjacent devices may be adjusted to reduce the dot size of ink dots produced.

It will also be appreciated that this technique may be used with laser and LED printers and photocopiers and other types of digital printers where the placement of an ink dot is dependent on individual activation of a device or component. For example, an LED in a LED printer may fail or there may be a defect in the photoconductive imaging drum of a laser printer. In both cases, adjusting the size of adjacent dots can hide or reduce the visual effect of the defect in the device or component.

In the case of a laser or light emitting device type printer dot size may be modified by modulating the intensity and or total amount of the light falling on the corresponding portion of the photoelectric imaging drum.

I claim:

1. A method of modifying an image to be digitally printed by a printing device to compensate for failure to correctly print dots of ink at specific locations, the method including the steps of:

identifying a first defective location, identifying a second location adjacent or near to the defective location;

compensating for the defective location by adjusting the dot size of the second location; wherein the step of adjusting the dot size of the second location occurs without adjusting the dot size of the defective location.

2. The method of claim 1 wherein the dot size of said adjusted dot or dots is increased if no dot or an undersize dot is printed at the respective specific location.

3. The method of claim 1 wherein the dot size of said adjusted dots is decreased if an oversize drop is printed at the respective specific location.

4. The method of claim 1 wherein dots located both transversely and longitudinally spaced from the respective location are adjusted in size.

5. The method of claim 1 wherein selected oversize adjusted dots contact or overlap adjacent dots.

6. The method of claim 1 wherein selected adjusted size dots do not contact or overlap adjacent dots.

7. A printer having a row of activatable devices which, when activated, cause rows of dots to be deposited onto a substrate and means to move the substrate relative to the row of devices in a direction generally perpendicular to the row of dots, said printer including:

analyzing apparatus to determine if one or more of said devices is not operating correctly; and control means for analysing images or image data and for identifying a first defective location where a dot of ink should be printed by activation of an incorrectly operating device and to determine a second location adjacent or near to the defective location; and compensating means to compensate for the defective location by adjusting the dot size of the second location; wherein the compensating means adjusts the dot size of the second location occurs without adjusting the dot size of the defective location.

8. The printer of claim 7 wherein the control means adjusts the size of dots deposited in the same row as the respective specific location by one or both of the devices on either side of the failed device.

9. The printer of claim 7 wherein the control means adjusts the size of dots deposited by one or both of the devices on either side of the failed device at least one row adjacent or near to the row of the respective specific location.

10. The printer of claim 7 wherein if no dot or an undersized dot is produced by activation of the incorrectly operating device the size of dots produced by activation of one or both of the devices adjacent to the incorrectly operating device is increased.

11. The printer of claim 7 wherein the devices are thermo mechanical ink ejection devices and said control system causes the ejection devices to be activated for a longer period of time or supplies a larger driving signal, or both.

12. The printer of claim 7 wherein said devices are light emitting devices and wherein the amount of light emitted by said light emitting devices is adjusted.

13. The printer of claim 7 wherein said devices are portions of a photoconductive imaging drum and the dot size of said adjusted dots is adjusted by varying the amount of light the respective device is exposed to.

14. The printer of claim 7 wherein at least some oversize adjusted dots contact or overlap with adjacent dots.

15. The printer of claim 7 wherein adjusted size dots do not overlap contact with adjacent dots.

* * * * *